(12) United States Patent
Bhuma et al.

(10) Patent No.: US 11,107,061 B2
(45) Date of Patent: Aug. 31, 2021

(54) SYSTEM AND METHOD FOR IMPLEMENTING PAYMENT VIA QUICK RESPONSE (QR) CODE

(71) Applicant: JPMorgan Chase Bank, N.A., New York, NY (US)

(72) Inventors: Venkata Suresh Reddy Bhuma, Aurora, IL (US); Payal Gandhi, Chicago, IL (US); Kim T. Le, Plainfield, IL (US); Majd H. Rimmawi, Tinley Park, IL (US); Paras Shah, Carol Stream, IL (US); Maria Elena Zamora Kriegsmann, Chicago, IL (US); Bijay Singh Kunwar, Chicago, IL (US); Wei Li, Willowbrook, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 104 days.

(21) Appl. No.: 15/917,023

(22) Filed: Mar. 9, 2018

(65) Prior Publication Data

US 2018/0260806 A1    Sep. 13, 2018

Related U.S. Application Data

(60) Provisional application No. 62/469,574, filed on Mar. 10, 2017.

(51) Int. Cl.
*G06Q 20/32*    (2012.01)
*G06Q 20/22*    (2012.01)

(52) U.S. Cl.
CPC ....... *G06Q 20/3274* (2013.01); *G06Q 20/223* (2013.01); *G06Q 20/3226* (2013.01); *G06Q 20/3276* (2013.01)

(58) Field of Classification Search
CPC .......... G06Q 20/3276; G06Q 20/3274; G06Q 20/223; G06Q 20/3226
See application file for complete search history.

(56) References Cited

U.S. PATENT DOCUMENTS

| 8,720,771 | B2* | 5/2014 | MacKinnon | G06K 5/00 235/375 |
|---|---|---|---|---|
| 9,760,871 | B1* | 9/2017 | Pourfallah | G06Q 50/22 |
| 10,688,385 | B2* | 6/2020 | Rose | G06Q 30/0241 |
| 2012/0267432 | A1* | 10/2012 | Kuttuva | G06Q 20/26 235/379 |

(Continued)

*Primary Examiner* — Mike Anderson
*Assistant Examiner* — Matthew Cobb
(74) *Attorney, Agent, or Firm* — Hunton Andrews Kurth LLP (57) ABSTRACT

The invention relates to a method and system that implements a peer-to-peer transaction using a QR Code. The invention may be realized by a mobile device that comprises: a memory component that stores customer data; and a computer processor, coupled to the memory, programmed to: send a request for a QR Code for a transaction, wherein the request comprises an amount and a time period; responsive to the request, receive the QR Code on the mobile device; present the QR Code to a payer for the transaction; and receive a payment based on the QR Code, from the payer, where the payment is received in an account associated with the QR Code.

6 Claims, 12 Drawing Sheets

(56) References Cited

U.S. PATENT DOCUMENTS

| | | | | |
|---|---|---|---|---|
| 2014/0129428 A1* | 5/2014 | Tyler | ............... | G06Q 30/06 |
| | | | | 705/39 |
| 2014/0304157 A1* | 10/2014 | Bachenheimer | .... | G06F 21/6254 |
| | | | | 705/44 |
| 2014/0316991 A1* | 10/2014 | Moshal | ............. | G06Q 30/0633 |
| | | | | 705/64 |
| 2015/0073907 A1* | 3/2015 | Purves | ............... | G06F 3/011 |
| | | | | 705/14.58 |
| 2015/0088674 A1* | 3/2015 | Flurscheim | ........ | G06Q 20/3276 |
| | | | | 705/17 |
| 2016/0012465 A1* | 1/2016 | Sharp | ............... | G06Q 20/386 |
| | | | | 705/14.17 |
| 2017/0024738 A1* | 1/2017 | Vaidyanathan | ........ | G06Q 20/10 |

* cited by examiner

| Home | Accounts | Q-Pay | Bill Pay | Pay by QR new | Logout | Account Number: **********1234 Balance: $3,339.01 |
|---|---|---|---|---|---|---|

Transactions

510   512

| Merchant | Amount | Date |
|---|---|---|
| Comed | -$5.00 | 01/01/18 |
| FundRaiser 🔲 | -$50.00 | 01/01/18 |
| Cub Scouts 🔲 | $50.00 | 01/01/18 |
| N. Gas | -$10.00 | 02/01/18 |
| Portillos | -$10.00 | 03/01/18 |
| Universal Cab | -$50.00 | 01/01/18 |
| Car Service | -$50.00 | 01/01/18 |
| Q-Pay to Donald | -$50.00 | 01/01/18 |
| Salary Direct Deposit | $2000.00 | 01/01/18 |

SYSTEM AND METHOD FOR IMPLEMENTING PAYMENT VIA QUICK RESPONSE (QR) CODE

CROSS REFERENCE TO RELATED APPLICATIONS

The application claims priority to U.S. Provisional Application 62/469,574, filed Mar. 10, 2017, the contents of which are incorporated herein in its entirety.

FIELD OF THE INVENTION

The invention relates generally to a system and method for implementing peer-to-peer payment via a quick response (QR) code.

BACKGROUND OF THE INVENTION

For small payments and infrequent payments, there is currently no easy way to make a transaction that does not involve cash or a complex payment process. Credit card payments require merchant registration, hardware set up (card readers), and/or lengthy online payment process, etc. These set-up processes are complicated, burdensome and time-consuming and in many cases require an exchange of Personally identifiable information (PII) data during the transaction.

These and other drawbacks currently exist.

SUMMARY OF THE INVENTION

According to one embodiment, the invention relates to a computer implemented system that makes a peer-to-peer transaction using a QR Code. According to an embodiment of the present invention, a mobile device comprises: a memory component that stores customer data; and a computer processor, coupled to the memory, programmed to: send a request for a QR Code for a transaction, wherein the request comprises an amount and a time period; responsive to the request, receive the QR Code on the mobile device; present the QR Code to a payer for the transaction; and receive a payment based on the QR Code, from the payer, where the payment is received in an account associated with the QR Code.

According to one embodiment, the invention relates to a system that implements a peer-to-peer transaction using a QR Code. According to an embodiment of the present invention, the system comprises: a memory component that stores customer data; an interactive user interface; and a computer processor, coupled to the memory and the interface user interface, programmed to: provide a first option to generate a QR code to pay a transaction and a second option to generate a QR code to receive funds; receive a request for a QR Code for a transaction, wherein the request comprises an amount and a time period; responsive to the request, transmit the QR Code to be received on a mobile device; and initiate a payment based on the QR Code, where the payment is made on an account associated with the QR Code.

According to one embodiment, the invention relates to a mobile device that makes a customer-to-merchant transaction using a QR Code. According to an embodiment of the present invention, the mobile device comprises: a memory component that stores customer data; and a computer processor, coupled to the memory, programmed to: scan a QR code from a communication, wherein the QR code comprises an amount and a time period; validate the QR code with a service provider; responsive to the request, receive the QR Code details on the mobile device; and send a payment based on the QR Code, from the payer, where the payment is received in a merchant account associated with the QR Code.

The computer implemented system, method and medium described herein provide unique advantages to customers, according to various embodiments of the invention. The innovative system and method provides a secure and simplified solution that implements peer-to-peer transactions using QR Codes, without having to exchange personal information, sensitive data, etc. The innovative system and method also avoids having to perform complex pre-configuration and set-up prior to making payment. The features of an embodiment of the present invention provides a solution that provides a way to make small payments without having to exchange PII data. By avoiding exchange of PII data, an embodiment of the present invention improves security and reduces fraud and other risks. Other advantages include customer loyalty and retention due to the increased satisfaction of the customer. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to providing QR Code payments for various transactions, including debit card, credit card and other transactions. For example, an account holder may generate a QR Code where the QR code is associated with an account, such as a debit account. In this example, a payer and a payment receiver may be clients of the same or affiliated financial institution that maintains customer accounts. The payment receiver may request a QR Code from the financial institution (or intermediary). The payment receiver may also generate a QR code from a mobile application executing on a mobile device. The QR Code may then be communicated to the financial institution (or intermediary) which may then associate the QR Code with an account of the payment receiver.

The QR Code may have an identifier, such as a global identifier (GUID), associated with a financial account or other funding account of the payment receiver. Notably, the QR Code may have no personal details. The QR Code may be presentable to the payer via a mobile application, a printed document, wireless transmission, electronic communication, or other form of communication or presentation. The payer may then scan a QR Code through a mobile application executing on a mobile device. The mobile application may identify an account associated with the presented QR Code and initiate a transfer of funds. In addition, rather than the mobile application identifying the receiving account, the financial institution (or intermediary) may associate the QR Code with a payment receiver's account. An embodiment of the present invention may then transfer funds from a payer's account to the payment receiver's account identified by the QR Code.

According to another scenario, a payer may generate a QR Code and allow the receiver to scan the QR code to accept the payment. A mobile application of the payer's mobile device may have an option to enter or edit an amount to pay and initiate an anonymous payment.

For example, a payer may request a QR code to make a payment for a transaction. The payer may identify the transaction, such as transaction details, an amount and a valid time period. The receiving entity may scan the QR code, which is associated with an account of the payer. The receiving entity may approve the transaction and payment. If necessary, the receiving entity may also edit certain fields. The payment may then be made by transferring funds from the payer account to an account associated with a receiving entity.

When both payer and payment receiver are clients of a financial institution, the interaction is secure and there is minimal chance for fraud. This further promotes loyalty from current and new customers. An embodiment of the present invention also support payers and payment receivers having accounts at different financial institutions. In this scenario, the financial institutions may enter into an agreement to support the various embodiments of the present invention. According to another example, a group of financial institutions may participate in a consortium to provide and/or support the features described herein.

The embodiments of the present invention may be utilized for various applications, including curbside check-in, porter services, housekeeping services, luggage delivery to room, valet parking, school field trips, concierge services, golf course caddy, child care, and various forms of tips and/or small cash payments.

For example, a customer may generate a QR Code to pay tips during a hotel stay. In this scenario, the customer may tip a curbside check-in person. The customer may generate multiple QR codes as well as a single QR code for multiple tips. The QR code may be set to expire at check-out, for example. According to another example, hotel workers may display QR codes on their mobile devices where hotel guests may scan to make small payments. Also, the QR codes may be displayed on badges of hotel workers. According to another example, QR codes may be displayed via digital screens throughout the hotel. For example, housekeeping QR codes may be displayed near the rooms (e.g., on each floor, near elevators, etc.). According to another example, customers may charge restaurant bills to their room but prefer to pay tips via a QR code displayed at the table and/or other part of the restaurant. QR codes may be displayed on a digital screen at or near the bar. Also, the QR codes may be displayed on a receipt. For valet and bell hop services, a QR code may be displayed at a kiosk or terminal near the front desk. Other configurations may be implemented.

Further, the embodiments of the present invention may support bill payments through a QR Code. For example, a merchant, medical provider, service provider and other entities may generate a QR Code that may be conveyed via a printed letter, an email, a text message and/or other electronic communication as well as an upload to an online portal or other webpage. Other forms of communication may be supported. A payer may then scan a QR Code and initiate a payment to the merchant. This avoids initiating an extensive process to set up online payments. For example, a medical provider may include a QR code in the bill to the patient. The bill may be printed, emailed and/or otherwise communicated. According to another example, as the patient is checking out of the medical provider, the patient may be presented with a QR code for the co-pay and/or other expenses.

According to an embodiment of the present invention, QR Code payments may be made through a credit card. In this example, merchants may generate a QR Code and present the QR Code to the payer. The payer may scan the QR Code via a mobile application (or other mechanism) to make a payment. This will allow a service provider to not lose a transaction commission. For example, a payer may scan the QR Code via a mobile device executing a mobile application. The mobile application may provide an option to choose a credit card (or other account) to make a payment.

An embodiment of the present invention may be directed to managing a user's QR codes. According to an embodiment of the present invention, one account may have multiple QR Codes for each event, merchant, provider, purpose, designated time period, etc. Each QR Code may have a valid time period, including a start date and an expiration date. QR Codes may have amount limits and other restrictions and characteristics. QR Codes may be transmitted via various communication modes, including email, text, website, etc. QR Codes may be saved, stored, tracked and managed. Also, QR Codes may be invalidated and/or modified. And, QR Codes may also be printed, transmitted and/or communicated. An embodiment of the present invention may store and manage prior QR Codes and automatically generate templates for the users to simplify and expedite QR Code generation. The various embodiments of the present invention may provide the ability to pay and receive payments with no exchange of PII data and no registration.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Figure 1:
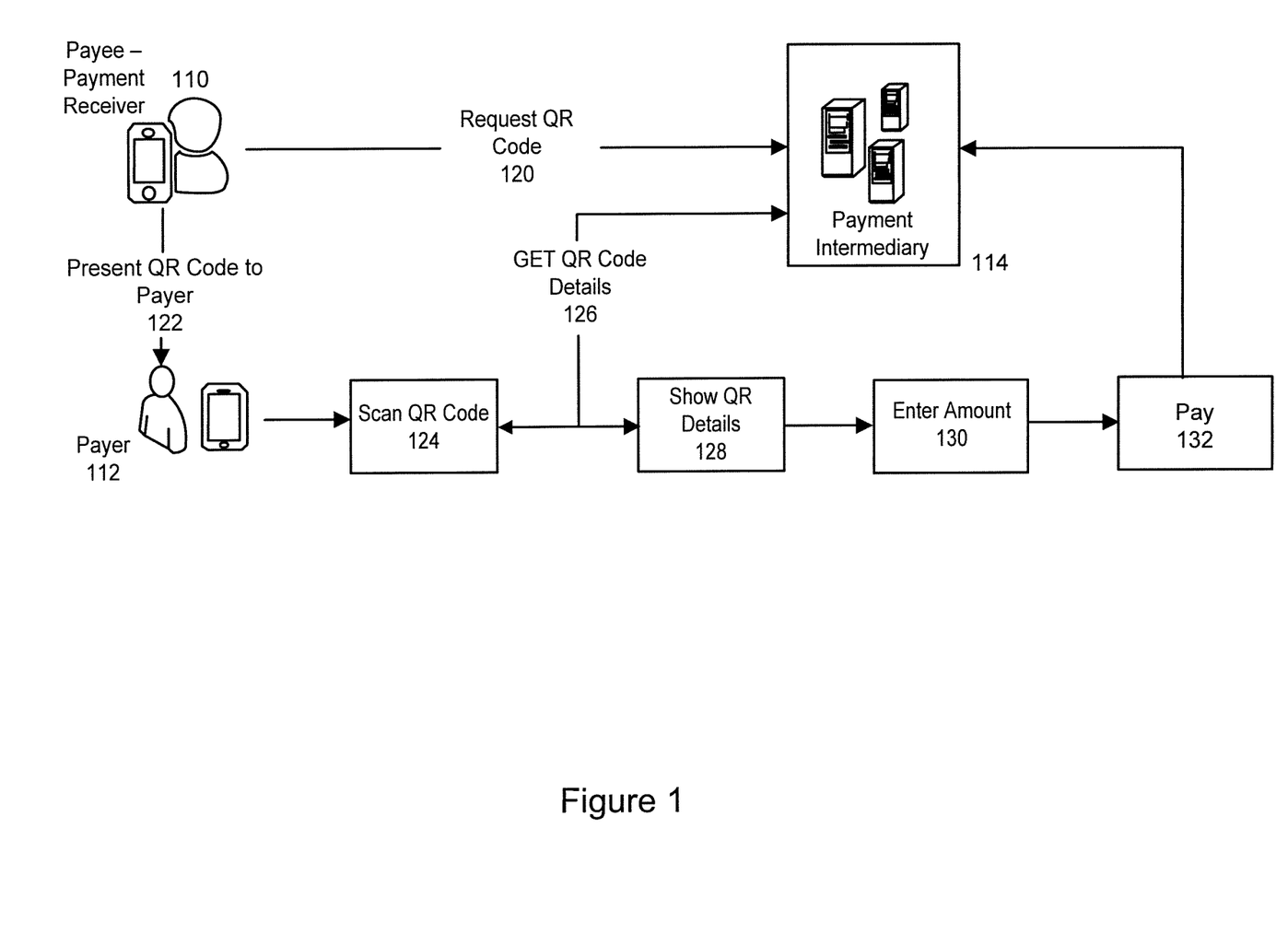
FIG. 1 illustrates a schematic diagram of a system that provides peer-to-peer payments with QR Codes, according to an exemplary embodiment.

FIG. 1 illustrates a schematic diagram of a system that provides peer-to-peer payments with QR Codes, according to an exemplary embodiment. As shown in FIG. 1, a customer may make a peer-to-peer payment with a debit card (or other payment instrument) or extension to an existing online service that allows a customer to send money to and receive funds from virtually anyone without having to exchange personal information.

Payment receiver 110 may represent a person who is receiving payment or funds from a payer. In the example of FIG. 1, a payment receiver 110 may request a QR Code from a payment intermediary 114, as shown by 120. The QR Code may have specific characteristics, such as dollar amount, dollar range, valid time frame, etc. The QR Code may also specify where it is valid (e.g., merchant, provider, location, etc.). The QR Code may also be restricted to a use, purpose, event, etc. Other restrictions may be applied. Also, the restrictions may be dynamic and change based on circumstances, events, time period, etc. According to another example, the QR Code may be generated from an application executing on a mobile device or other device. The QR Code may be communicated to the Payment Intermediary 114 which then associates the QR Code with an account of the payment receiver.

When the QR Code is generated, the QR Code may include an identifier that is associated with an account, such as a financial account, debit account, a card product (e.g., credit card loyalty card and/or other form of funds). The payment receiver may then present the QR Code to a Payer 112, as shown by 122. The QR Code may be printed, electronically transmitted, viewed via a mobile or other device, etc. The Payer 112 may scan the QR Code, at 124. The payer may send a request to retrieve QR details from Payment Intermediary 114, as shown by 126. Also, the payer may then view QR details at 128 and confirm QR details and/or enter specifics at 130. For example, the payer may enter an amount to receive a payment or other transaction. Payment may be initiated and made at 132, via Payment Intermediary 114.

The QR code may be generated by a Payment Intermediary where the QR code is associated with an account holder's account. The Payment Intermediary may be associated with a financial institution. According to another scenario, the Payment Intermediary may be a third party provider independent from a financial institution.

The QR Code may represent a unique pattern, code, barcode, and/or other identifier that may be electronically scanned or captured. The QR Code may represent a machine-readable optical label that contains information. The QR Code may include various extensions, including an image, pattern, alphanumeric characters, etc. In accordance with the various embodiments of the present invention, while a QR Code has been described, the invention may implement other types of codes, identifiers, images, and/or other unique indicia or representation.

The QR Code may be used for a one-time transaction, recurring transaction or other payments and/or events. A payment receiver may generate a QR Code for each transaction. The payment receiver may also generate a QR Code for a group of payments for an event or other purpose. The QR Code may be used multiple times by different users or types of users. A group of users may share use of a QR Code. A parent may use a QR Code to pay multiple school events for children at the same school or even different schools. A household may share use of a QR Code, etc.

For example, a teacher may request payment for a school activity, such as a class trip. In this example, the teacher may email or send a permission form with a QR Code. The teacher may set up the QR Code so that each child will have a unique QR Code. Also, the teacher may set up one QR Code for the entire class where each child may designate a student name or identifier when making the payment. Other variations may be implemented based on user preference, type of event, efficiencies and/or other characteristics.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 2:
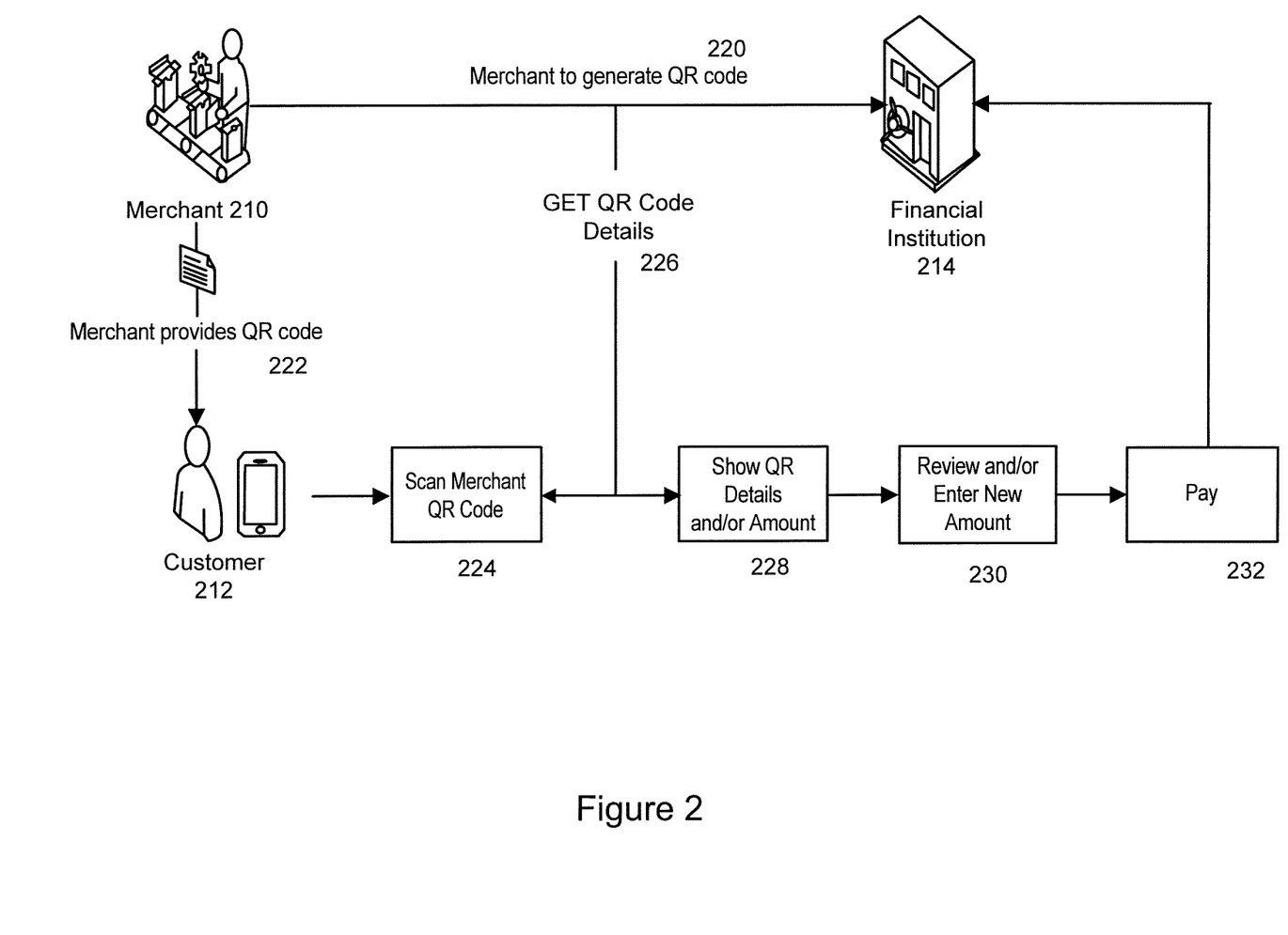
FIG. 2 illustrates a schematic diagram of a system that provides customer-to-merchant payments with QR Codes, according to an exemplary embodiment.

FIG. 2 illustrates a schematic diagram of a system that provides customer-to merchant payments with QR Codes, according to an exemplary embodiment. As shown in FIG. 2, a merchant 210 may receive a payment using QR Codes. This solution may be leveraged by debit card, credit card and other payment instruments. For example, a merchant may generate a QR Code specific for a transaction, as shown by 220. The QR Code may be communicated to the Financial Institution 214 which may then associate the QR Code with a merchant account. The merchant 210 may also print the QR Code in a letter, email or other communication to a customer, at 222. For example, the merchant may share the QR Code via a terminal, kiosk, PoS, self-checkout, front desk, tablet, etc. The QR Code may be shared using wireless technology, such as NFC, Bluetooth, etc. A customer 212, e.g., Card Holder, may scan a merchant QR code, at 224. The customer may retrieve QR details, at 226. The customer may view or otherwise access QR details and amount, at 228. The customer may review and/or enter a new amount, at 230, and then make a payment or other transaction, at 232.

For example, a doctor's office may generate a QR Code for patients. When the patient receives a bill and scans the QR Code, the patient may view QR details, enter or confirm the amount. Using the unique QR Code, the doctor's office may facilitate the reconciliation of payments. According to another example, as the patient is checking out of the medical provider, the patient may be presented with a QR code for the co-pay and/or other expenses.

Figure 3:
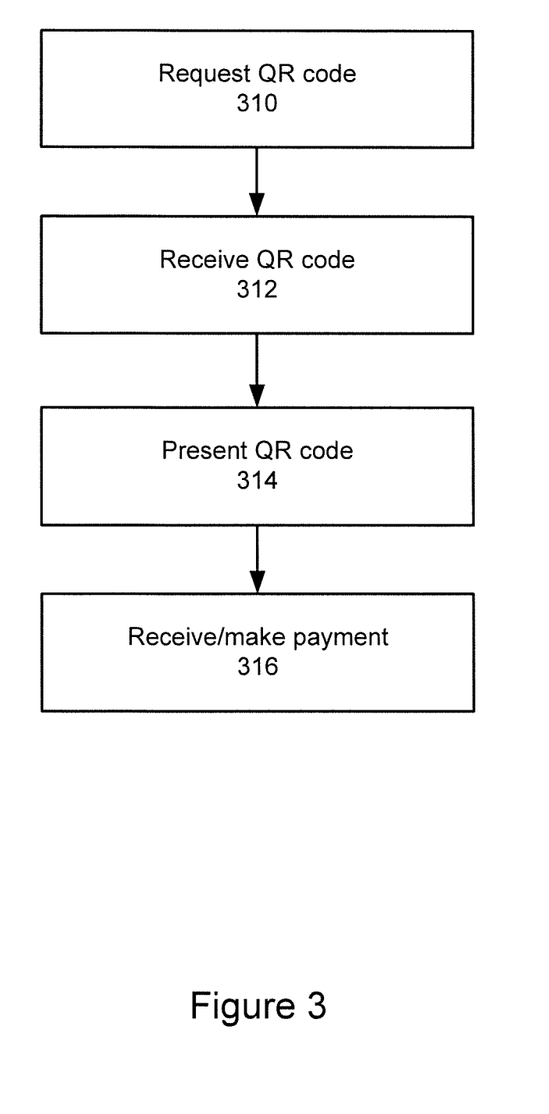
FIG. 3 is an exemplary flowchart of a method for implementing a QR code payment, according to an embodiment of the present invention.

FIG. 3 is an exemplary flowchart of a method for requesting a QR code payment, according to an embodiment of the present invention. At step 310, a payment receiver requests a QR code. The QR code may be specific to a transaction, transaction type, merchant, service provider, recipient, etc. The payment receiver may identify QR code characteristics, e.g., valid time period, amount, amount range, etc. At step 312, the payment receiver may receive the QR code. The QR code may be received by a mobile device and/or other user device. At step 314, the payment receiver may present the QR code to a payer. The QR code may be presented electronically and/or other type of communication. The QR code may also be printed on a bill, invoice, letter or other document. At step 316, the payment receiver may receive payment from the payer. The payment may be received via an account associated with the QR code. Other type of funds or credit may be realized. An embodiment of the present invention may also apply to a payer requesting a QR code to make a payment to another entity. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

Figure 4:
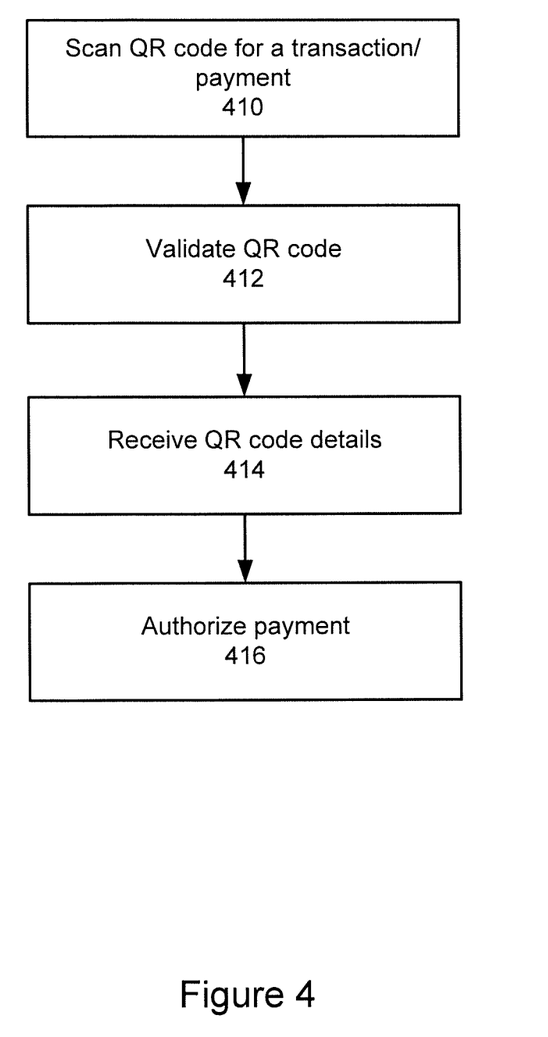
FIG. 4 is an exemplary flowchart of a method for implementing a QR code payment, according to an embodiment of the present invention.

FIG. 4 is an exemplary flowchart of a method for receiving a QR code payment, according to an embodiment of the present invention. At step 410, a payer may scan a QR code for a payment or other transaction. The QR code may be scanned via a mobile device or other user device with a camera or image capture feature. At step 412, the payer may validate the QR code. This may involve confirming that the QR code is for a valid transaction, purpose, time period and/or other conditions. At step 414, the payer may receive QR details. For example, the payer may confirm an amount or enter an amount. At step 416, the payer may authorize payment to the payment receiver. As noted above, an embodiment of the present invention may also apply to a payer requesting a QR code to make a payment to another entity. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

Figure 5:
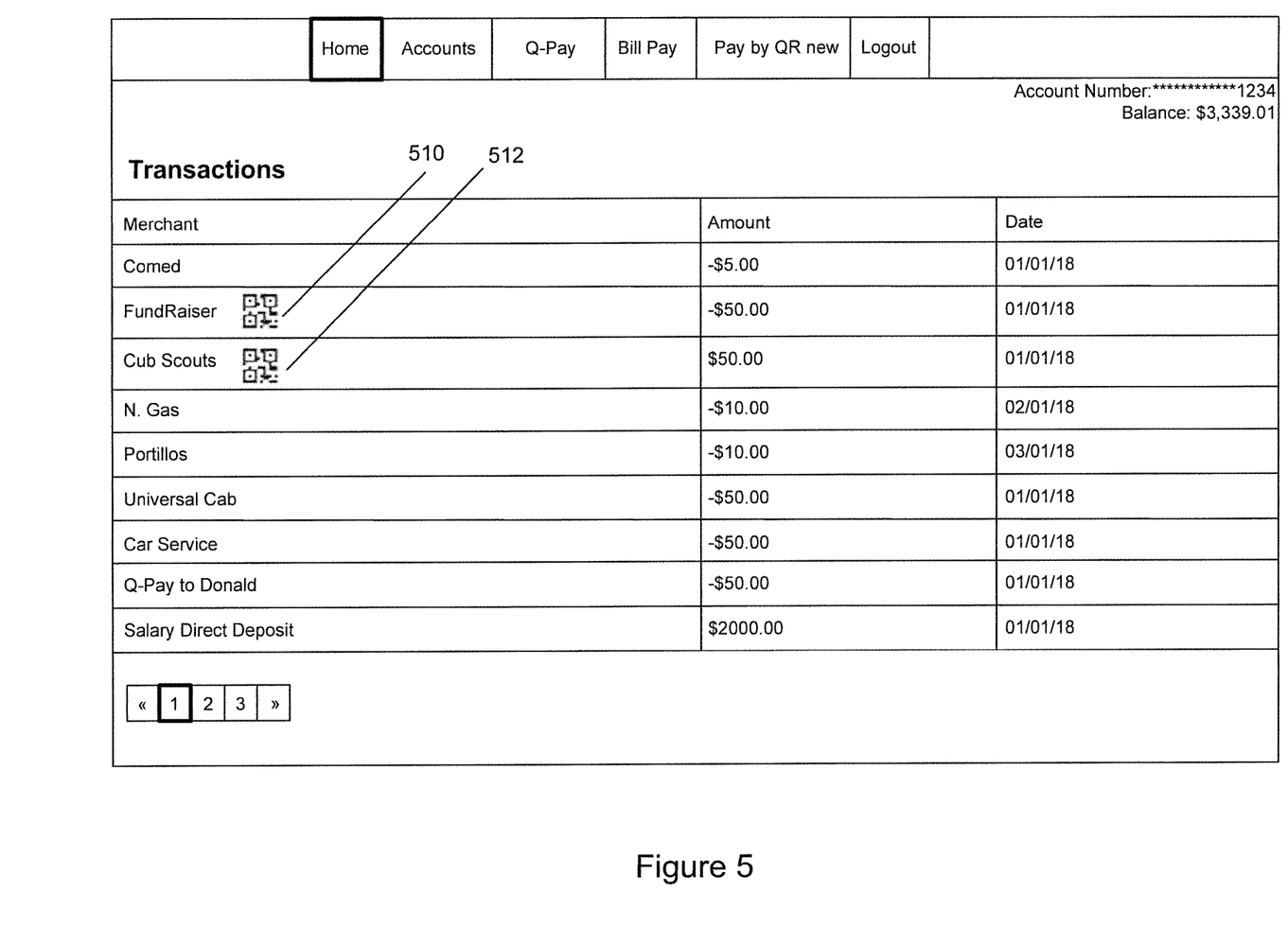
FIG. 5 is an exemplary screenshot of transaction details, according to an embodiment of the present invention.

FIG. 5 is an exemplary screenshot of transaction details, according to an embodiment of the present invention. As shown in this example, the account holder may view transactions associated with an account where QR Code transactions are identified by a symbol or other identifier shown by 510, 512. Amount, date and other details may be provided. A customer may have multiple active QR Codes where QR Code activity may be tracked. For example, the system may validate payments based on amount and validity limits. Other activities and features may be observed and tracked.

Figure 6:
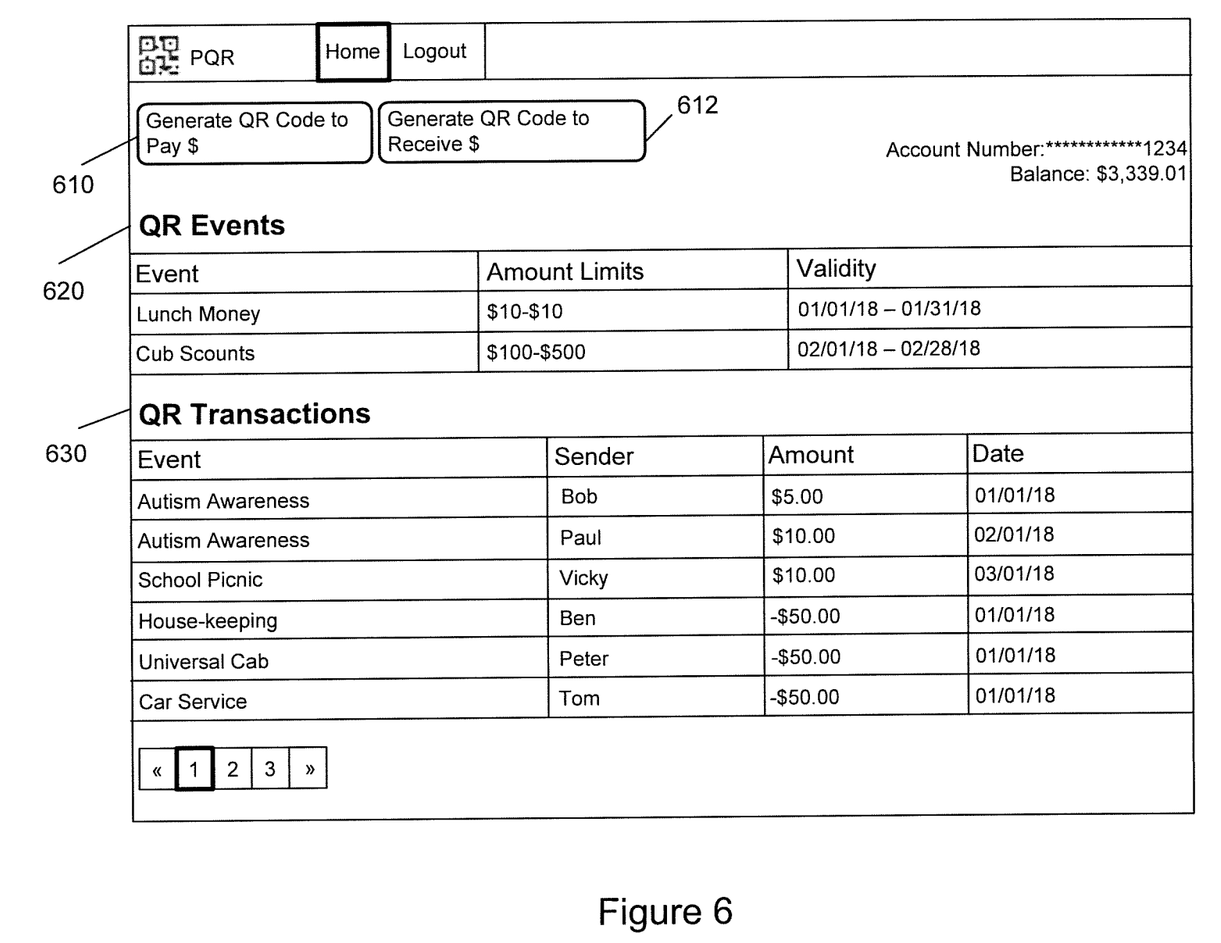
FIG. 6 is an exemplary screenshot of QR information, according to an embodiment of the present invention.

FIG. 6 is an exemplary screenshot of QR information, according to an embodiment of the present invention. An account holder may be provided with QR Code options, including an option to generate a QR code to pay at 610 and an option to generate a QR code to receive at 612. As shown in FIG. 6, a user may view QR Events 620 and QR Transactions 630. QR events may include transactions, such as lunch money, activity fees, etc. Each QR event may have an amount range and a valid time period. Other characteristics and restrictions may be applied. QR Transactions may include a sender (or originator), amount and date of transaction. Other characteristics and restrictions may be displayed. QR Transactions may include transactions where funds were received as well as transactions where funds were paid (denoted by a minus sign). Other details may be provided.

QR events may represent activities that a user receives payments for. QR Transactions may represent a currency exchange for an activity. In the example "Lunch Money," the activity is the Lunch event and the transactions may represent the actual payments sent and received for the event.

In the example shown in FIG. 6, the QR Events and QR Transactions are specific to an account. An account holder may have active QR Codes across multiple accounts. Also, a business or a household may manage QR codes for one or more accounts which may be associated with one or more financial institution.

Figure 7:
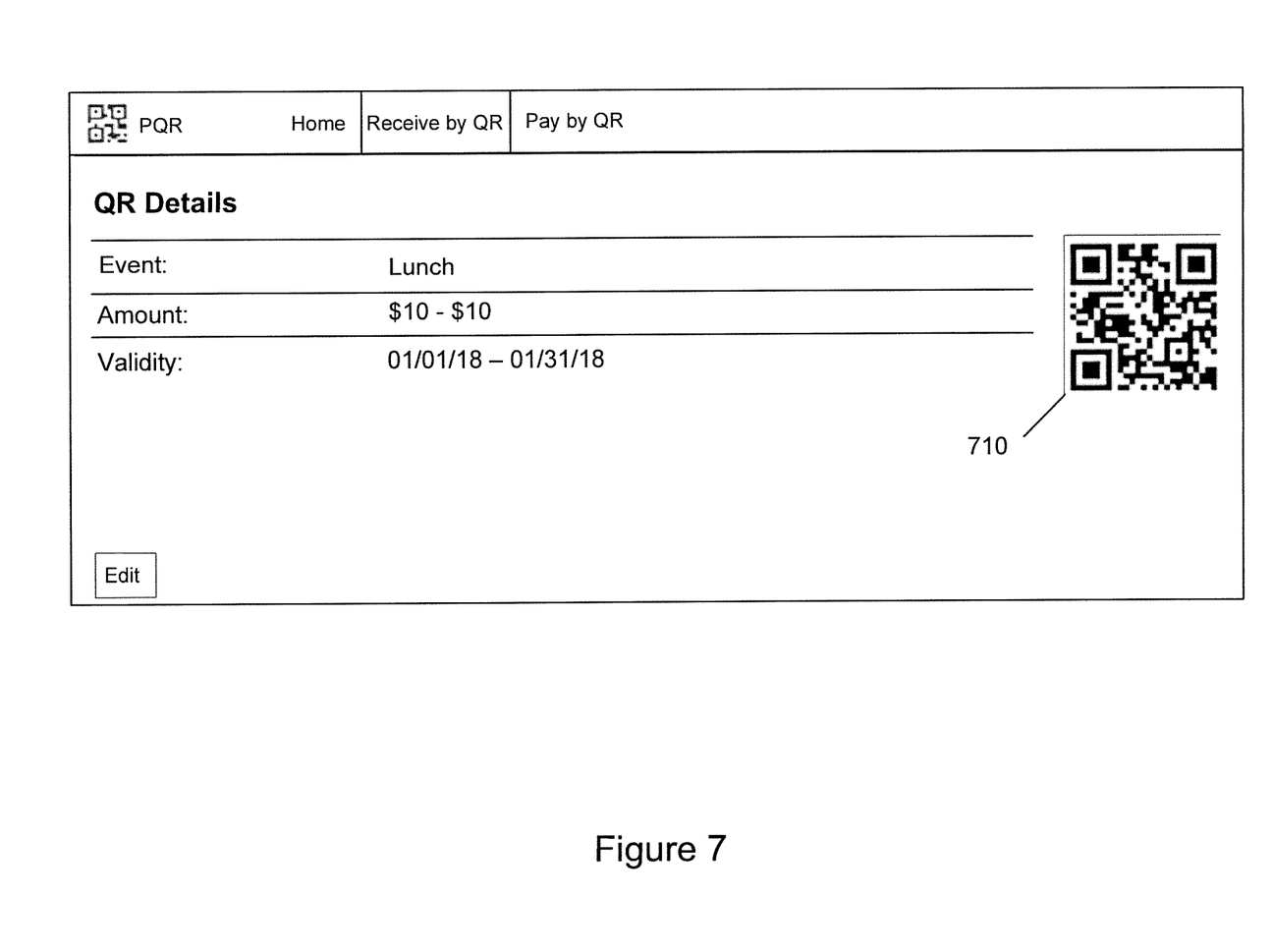
FIG. 7 is an exemplary screenshot of QR details, according to an embodiment of the present invention.

FIG. 7 is an exemplary screenshot of QR details, according to an embodiment of the present invention. FIG. 7 is an exemplary interface for a specific QR code. In this example, the details of QR Event "lunch money" from FIG. 6 are provided. QR details may include event, amount, validity and/or other information. The event may include a type of event and/or other identifier. Amount may be a dollar amount, range and/or other indicator of funds. Depending on the type of event, other details may be provided. A corresponding QR code may be displayed at 710.

Figure 8:
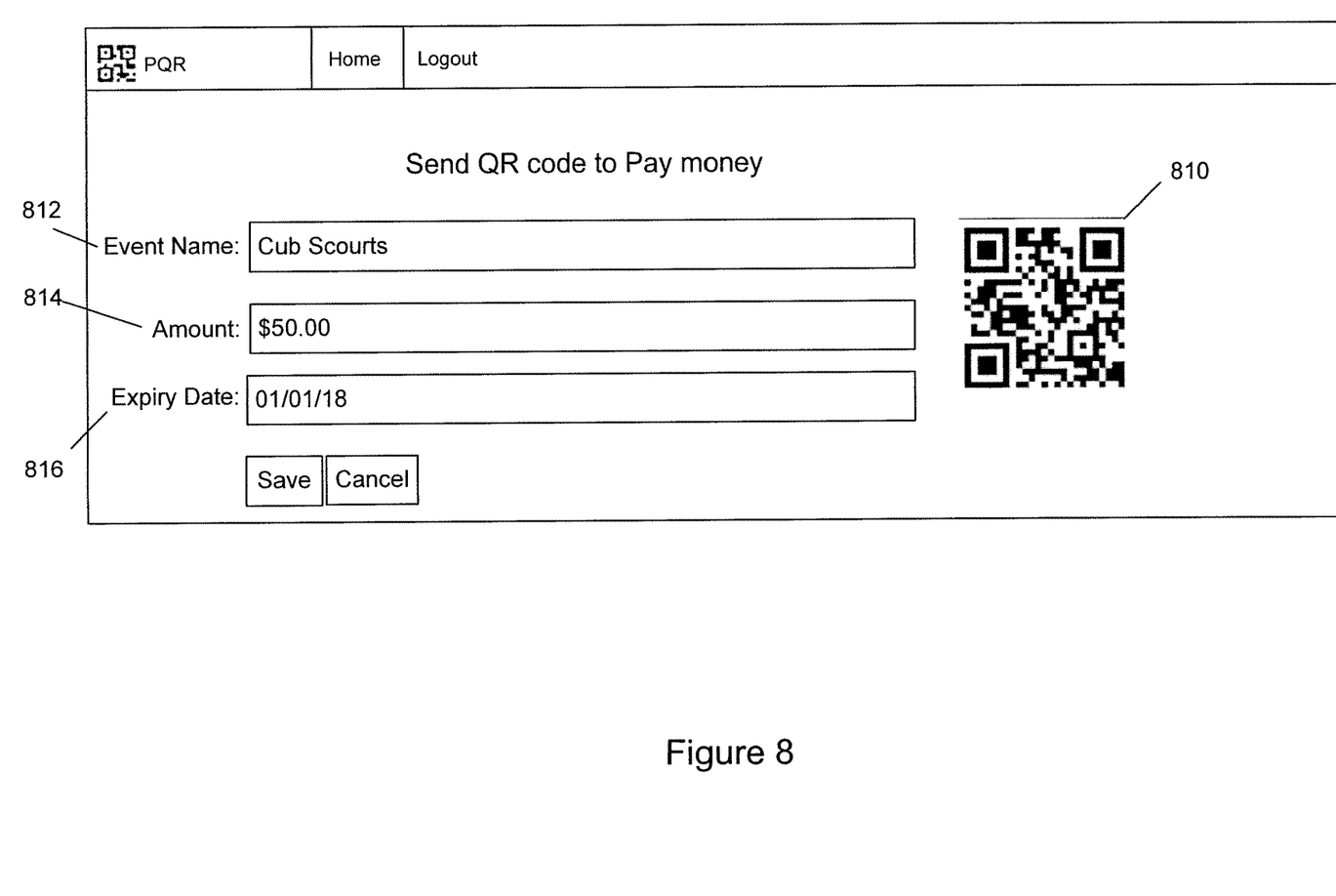
FIG. 8 is an exemplary screenshot of a QR Code, according to an embodiment of the present invention.

FIG. 8 is an exemplary screenshot of a QR Code, according to an embodiment of the present invention. As shown in FIG. 8, a user may send a QR Code to make a transaction. In this example, the user may specify an event at 812, amount at 814 and a valid time period at 816. The event may include a type of event and/or other identifier. Amount may be a dollar amount, range and/or other indicator of funds. Depending on the type of event, other details may be provided. The time period may be a date, range of dates, end of an event, etc. An image of the QR may be provided at 810.

Figure 9:
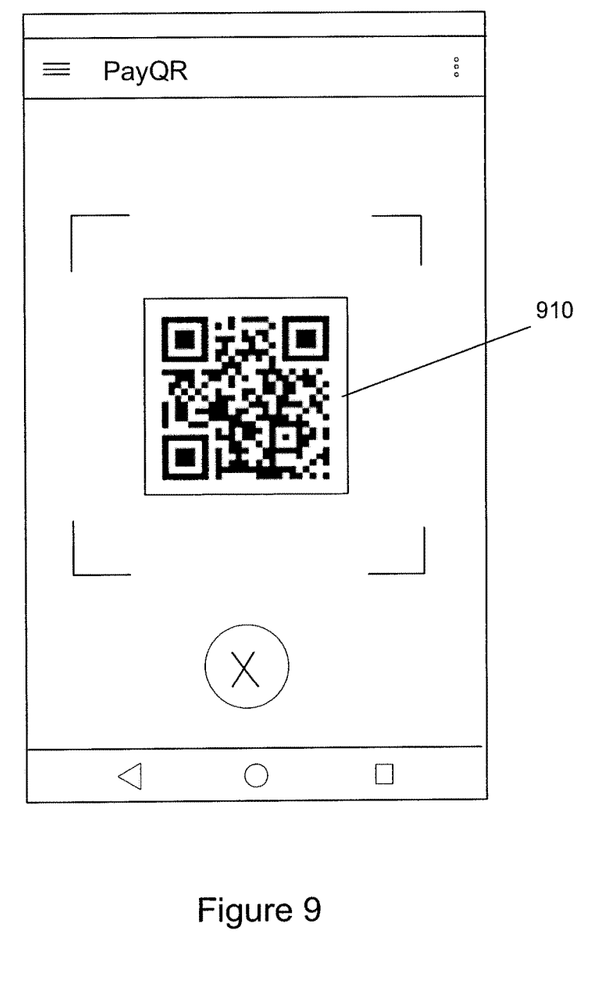
FIG. 9 is an exemplary screenshot of mobile device scanning a QR Code, according to an embodiment of the present invention.

FIG. 9 is an exemplary screenshot of mobile device scanning a QR Code, according to an embodiment of the present invention. A mobile device may include a camera feature that takes an image of a QR code 910.

Figure 10:
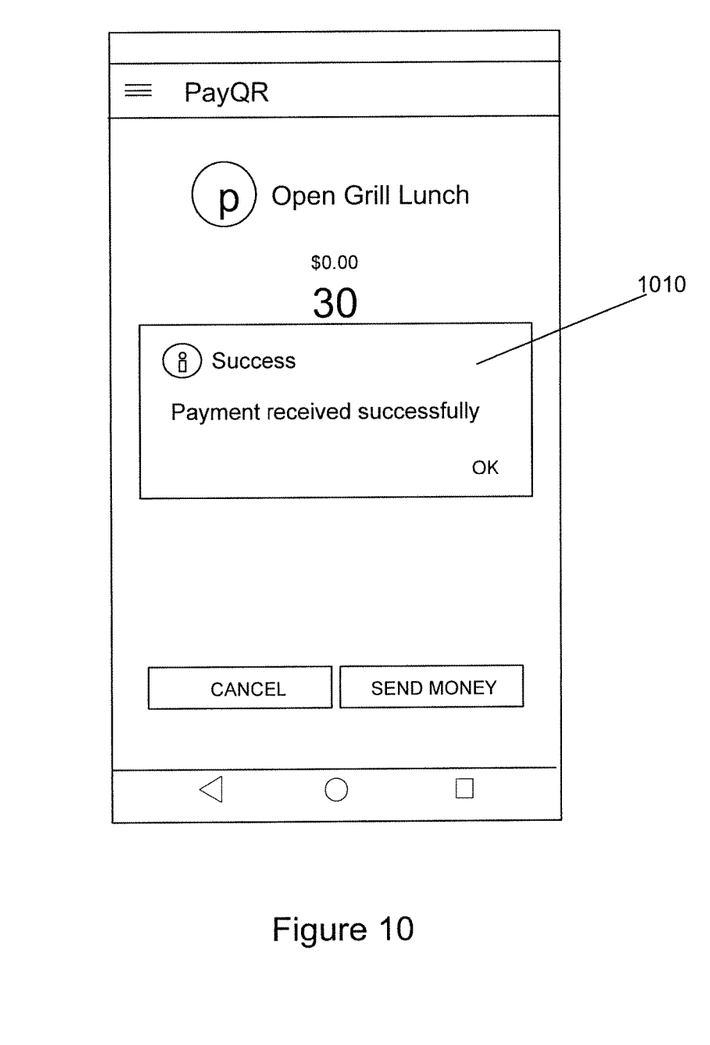
FIG. 10 is an exemplary screenshot confirming receipt of payment via a QR Code, according to an embodiment of the present invention.

FIG. 10 is an exemplary screenshot confirming receipt of payment via a QR Code, according to an embodiment of the present invention. Window 1010 indicates that payment was successfully received. Other forms of notification may be provided.

Figure 11:
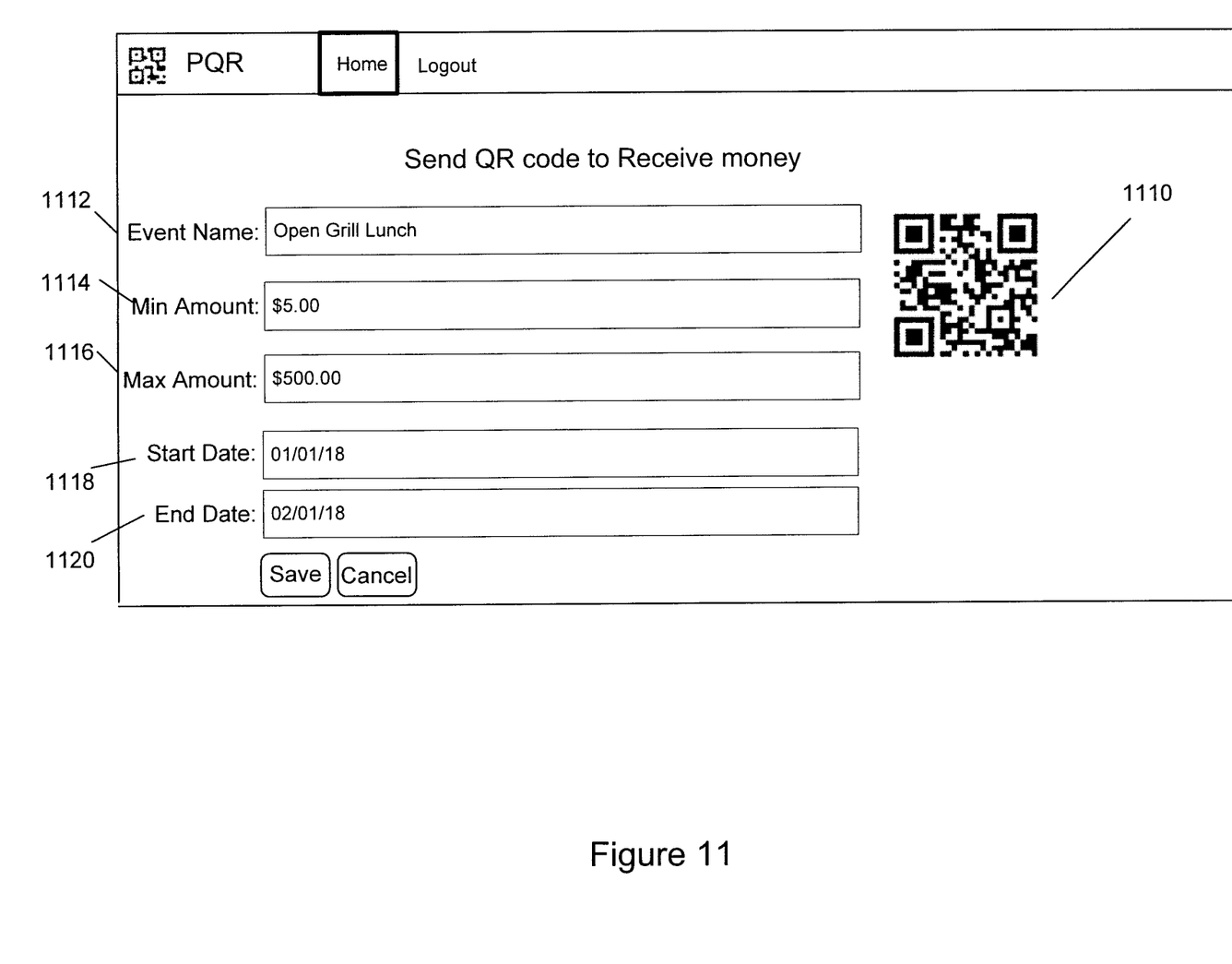
FIG. 11 is an exemplary screenshot of a QR Code, according to an embodiment of the present invention.

FIG. 11 is an exemplary screenshot of a QR Code, according to an embodiment of the present invention. As shown in FIG. 11, a user may send a QR Code to receive funds for a transaction. In this example, the user may specify an event at 1112, an amount may be expressed as a minimum amount at 1114 and a maximum amount at 1116. The user may also provide a valid time period which may be expressed as a start date at 1118 and an end date at 1120. Other forms of expressing amount and time period may be realized. Depending on the type of event, other details may be provided. The time period may be a date, range of dates, end of an event, etc. An image of the QR may be provided at 1110.

For example, a merchant, such as a restaurant, may send a QR code to receive payment. In this example, the merchant may send a QR code to a customer for a lunch payment. This QR code is valid for a dollar amount between $5.00 to $500.00. The QR code is valid for a month's time. The QR code may be used once or may be used multiple time within the month up to the maximum amount of $500.00.

Figure 12:
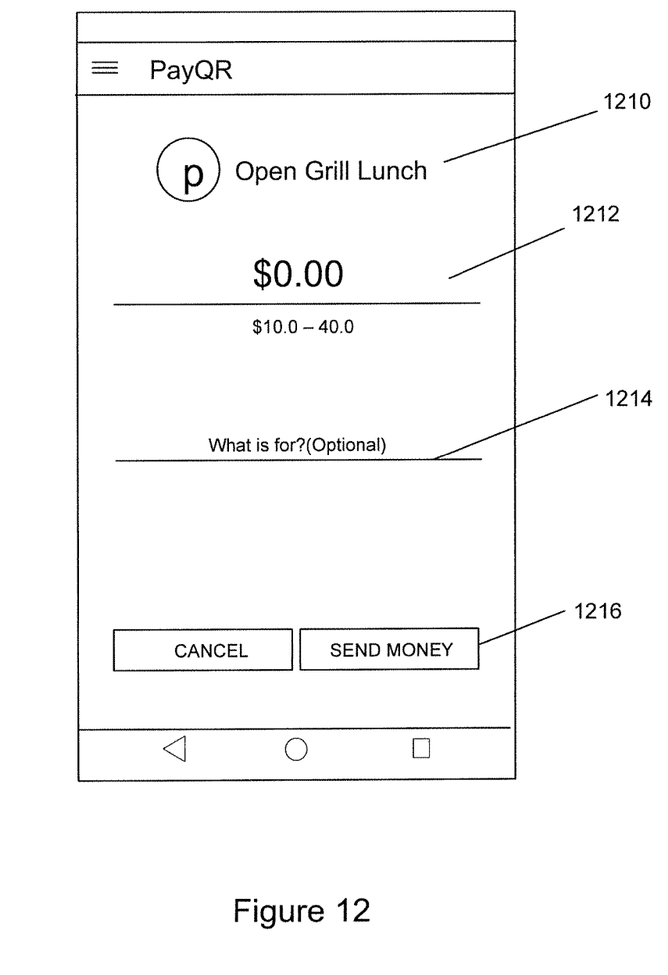
FIG. 12 is an exemplary screenshot confirming transmission of payment via a QR Code, according to an embodiment of the present invention.

FIG. 12 is an exemplary screenshot confirming transmission of payment via a QR Code, according to an embodiment of the present invention. In this illustration, the receiving entity may be a merchant, such as a restaurant. In this example, a merchant name is shown at 1210. The paying entity, such as a customer, may provide an amount within the range or other monetary conditions, at 1212. Additional input and details may be provided at 1214. For example, transaction details (e.g., a receipt, line item details, type of transaction, etc.) may be provided. The paying entity may then initiate transfer at 1216. According to another example, the interface may provide tip suggestions, notations/suggestions for the restaurant, note for the waitress, reviews, etc. The interface may also provide a link to social media accounts and/or other applications.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIGS. 1 and 2 include a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The components in FIGS. 1 and 2 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java®, Modula-2, Pascal®, Prolog, REXX, Visual Basic, and/or JavaScript®. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

The invention claimed is:

1. A mobile device that makes a peer-to-peer transaction using a Quick Response Code ("QR Code"), the mobile device comprising:
    a memory component that stores customer data; and
    a computer processor, coupled to the memory, programmed to:
    receive, from a payee, a request for a QR Code for a payment from a payer, the QR code comprising a payment amount and a time period which the QR Code will be active, the time period comprising a start date and an expiration date;
    generate, without any form of payee registration, the requested QR Code;
    communicate the QR Code to a financial institution;
    receive, from the financial institution, an updated QR Code on the mobile device containing the payment amount and the time period which the updated QR Code will be active, as well as a global identifier (GUID) that identifies a financial account of the payee and no payee personal information;
    present the updated QR Code to the payer via one or more of hardcopy, email, mobile application, and text message;
    receive confirmation of a payer authorization, upon the payer scanning the updated QR Code, for payment of the requested amount defined in the QR code within the requested time period;
    receive a payment based on the updated QR Code and the payer authorization, from the payer, where the payment is routed to the financial account identified by the GUID; and
    provide an interactive user interface for QR code management, configured to display to the payee on the payee device:
        a top bar with selectable buttons for accessing or designating one or more payee accounts, accessing a home screen, accessing a bill pay screen, and accessing a logout screen;
        a plurality of pending QR codes and supporting information for incomplete transactions, the supporting information for each incomplete transaction including a transaction description, a transaction amount, and a validity date range, wherein the interactive user interface allows the payee to edit, print, and transmit each of the plurality of pending QR codes;
        a plurality of completed QR codes and supporting information for finalized transactions, the supporting information for each finalized transaction including a transaction description, a payer, a transaction amount, and a transaction date, wherein the interactive user interface allows the payee to edit, print, and transmit each of the plurality of completed QR codes; and
        interactive buttons for creating a new QR code to pay or to receive payment for a new transaction, wherein payee selection of the interactive buttons causes a QR code generation template to be displayed to the payee on the payee device.

2. The mobile device of claim 1, wherein the amount comprises a minimum amount and a maximum amount.

3. The mobile device of claim 1, wherein the payer confirms the amount.

4. The mobile device of claim 1, wherein the QR Codes do not contain personally identifiable information.

5. The mobile device of claim 1, wherein the QR code is electronically presented to the payer.

6. The mobile device of claim 1, wherein the transaction comprises a debit card transaction.

* * * * *